United States Patent
Wang (10) Patent No.: US 7,539,899 B1
(45) Date of Patent: May 26, 2009

(54) CLONING MACHINE AND METHOD OF COMPUTER DISASTER RECOVERY

(76) Inventor: Chuan Wang, 2 Kitson Park Dr., Lexington, MA (US) 02421

( * ) Notice: Subject to any disclaimer, the term of this patent is extended or adjusted under 35 U.S.C. 154(b) by 4 days.

(21) Appl. No.: 11/634,284

(22) Filed: Dec. 5, 2006

Related U.S. Application Data (62) Division of application No. 10/939,231, filed on Sep. 9, 2004.

(60) Provisional application No. 60/502,058, filed on Sep. 11, 2003.

(51) Int. Cl.
*G06F 11/00* (2006.01)

(52) U.S. Cl. .......................... 714/15; 714/12

(58) Field of Classification Search .............. 714/2, 714/3, 5, 7, 12–13, 15, 42, 54
See application file for complete search history.

(56) References Cited

U.S. PATENT DOCUMENTS

| | | | |
|---|---|---|---|
| 5,133,065 A | 7/1992 | Cheffetz | |
| 5,142,680 A | 8/1992 | Ottman | |
| 5,212,772 A | 5/1993 | Masters | |
| 5,469,573 A | 11/1995 | McGill | |
| 5,799,147 A | 8/1998 | Shannon | |
| 5,842,024 A | 11/1998 | Choye | |
| 6,080,207 A | 6/2000 | Kroening | |
| 6,131,141 A | 10/2000 | Ravid | |
| 6,179,492 B1 | 1/2001 | Guy | |
| 6,317,845 B1 | 11/2001 | Meyer | |
| 6,591,376 B1 * | 7/2003 | VanRooven et al. | 714/36 |
| 6,594,743 B1 * | 7/2003 | Chen et al. | 711/162 |
| 6,802,029 B2 * | 10/2004 | Shen et al. | 714/38 |
| 6,952,794 B2 * | 10/2005 | Lu | 714/7 |
| 6,996,287 B1 * | 2/2006 | Weiss | 382/260 |
| 7,024,528 B2 * | 4/2006 | LeCrone et al. | 711/162 |
| 7,024,581 B1 * | 4/2006 | Wang et al. | 714/2 |
| 7,313,726 B2 * | 12/2007 | Shen et al. | 714/15 |
| 7,434,100 B2 * | 10/2008 | Hogdal et al. | 714/27 |
| 2002/0124245 A1 | 9/2002 | Maddux | |
| 2004/0172578 A1 * | 9/2004 | Chen et al. | 714/15 |
| 2007/0157178 A1 * | 7/2007 | Kogan et al. | 717/130 |

OTHER PUBLICATIONS

Preston, W. Curtis; "UNIX Backup and Recovery", O'Reilly, 1999.
McMains, John R. and Chronister, Bob; "NT Backup and Recover", Osborne/McGraw-Hill, 1998.
Legato Systems, Inc.; "Legato NetWorker Recovery Manager for UNIX Administrator's Guide", Legato Systems, Inc., Apr. 2002.
Brooks, Charlotte, et al.; "Disaster Recovery Strategies with Tivoli Storage Management", IBM Redbook, Nov. 2002.

(Continued)

*Primary Examiner*—Dieu-Minh Le (57) ABSTRACT

A computer cloning system and process comprising a cloning machine which modifies a survived or reproduced operating system ("OS") devices to adapt to new replacement hardware. The cloning processes are performed within the cloning machine, which is a separate machine from both the damaged and replacement machines. The modified OS device is then adapted to the replacement computer with different hardware. The cloning method of the present invention is a network independent solution. This invention may also be used for computer system hardware and/or software upgrades, computer testing, new computer installation, and system migration.

6 Claims, 3 Drawing Sheets

OTHER PUBLICATIONS

Veritas Software; "VERITAS Bare Metal Restore 4.6 for VERITAS NetBackup, Systems Administrator's Guide for UNIX and Windows", Veritas Software, 2003.

Symantec Corporation; "Norton Ghost User's Guide", Symantec Corporation, 2002.

Hewlett-Packard Development Company: "Ignite-UX Administration Guide", Hewlett-Packard Development Company, 2007.

Sun Microsystems, Inc.: "Solaris 9 9/04 Installation Guide", Sun Microsystems, Inc., 2004.

Hewlett-Packard Development Company: "Ignite-UX Installation Booting", Hewlett-Packard Development Company, 2007.

IBM Corporation: "AIX 5L Version 5.3 Installation Guide and Reference", IBM Corporation, 2004.

* cited by examiner

CLONING MACHINE AND METHOD OF COMPUTER DISASTER RECOVERY

CROSS-REFERENCE TO RELATED APPLICATIONS

This is a division of application Ser. No. 10/939,231, filed on 9 Sep. 2004, the contents of which are hereby incorporated by reference herein. This application also claims the benefit of U.S. Provisional Patent Application Ser. No. 60/502,058, filed 11 Sep. 2003, the contents of which are hereby incorporated by reference herein.

FIELD OF THE INVENTION

This invention relates generally to computer systems, and more specifically to the recovery of large numbers of computers that have been rendered inoperable.

BACKGROUND OF THE INVENTION

Every organization desires the ability to quickly restore its business operations from a disaster that causes complete computer system failures and to minimize the disruption to its business in case of a system failure. Such needs have become particularly urgent after the attacks on the World Trade Center in New York City, N.Y. on Sep. 11, 2001, during which many computer systems were destroyed, and were out of service for extended periods of time. As a result of this disaster many financial transactions were lost. US financial markets were closed for four (4) days until limited computer systems and business operations could be restored. Clearly, the information technology industry is in need of better methods for disaster recovery.

A. Operating System

Every computer requires system software to control and manage its operation. System software and data, often collectively known as the operating system ("OS"), are the essential elements of any system. The OS manages system hardware and software resources and provides various services to other non-system software, also known as application software. It can generally be separated from other non-system software components. It is a common practice, in a large enterprise environment, to save operating system and data on a separate storage device, often known as OS device, system device, OS disk, system disk, root disk, or operating system environment. The OS device is typically implemented with a physical disk or a logical disk. The system device is the most vulnerable and critical component of an enterprise-class computer system.

Modern operating systems are usually implemented with a layered software design. The innermost portion of an operating system is a core that manages system hardware and basic system operation. This core operating system manages all hardware and other software resources. It controls hardware devices and peripherals through special device files. This layer of OS is hardware dependent and shields the rest of the software components from the underlying hardware. The OS core provides basic system functions to all other parts of the system. This hardware dependent layer is often referred to as the kernel. Sometimes software components that control and manage hardware devices are known as device drivers. Traditionally OS cores are designed and implemented as a monolithic program that consequently exists on an OS disk as a single binary file. On the other hand, modern operating system cores are often modular and dynamic in design and divided into sets of linked modular programs. These OS core programs are usually segregated from other software codes in separate file directories on the OS disk.

Many modern operating systems are modular in software design, and are usually distributed as software modules. Each software module is a collection of files and directories that together provides a specific software function. For example, a device driver for a specific hardware device consists of a set of program files arranged within a specific file directory structure and provides specific functions to control and manage the said device. Software modules can be installed or removed with standard system management utilities to conform to a software industry standard known as the application binary interface (ABI). For each business machine, the OS is often uniquely customized. As a result, the actual system software and data of each business system is unique with respect to its business operation, actual hardware components, and software packages installed.

In case a system is destroyed, restoring the system software and data is always the first and the key step of any computer recovery procedure. A system recovery procedure generally relies on backup images of the OS disk or replicated system device. An OS backup image is made up of complete operating system files and data that an identical system device can be rebuilt from. If the hardware of the replacement machine is the same as the original system, reproducing the original system device is generally sufficient for a system recovery.

In practice, however, it is not uncommon that identical replacement hardware is not available, especially at the time of a disaster. Generally, if the replacement hardware is different from the original system, the replacement with a replicated system device will run into problems, since the originally installed hardware dependent software components are not compatible with the new replacement hardware. In particular, new model hardware devices require different device driver programs. Consequently, hardware dependent system files and data on the rebuilt system device need to be modified or replaced to adapt to the new hardware. These hardware dependent system files and data are generally very small, typically less than one percent of the entire operating system disk image in size. These relevant codes and data can be generated or derived from OS installation tools provided by OS manufacturers. As long as the replacement hardware is supported by the OS, the replacement system can be installed with the same release level of the OS as the original. Thus the working OS image contains all working system files and data including those specific to the replacement hardware. Updating hardware dependent system files and data can be accomplished by using standard system administration utilities, including standard file management and software management tools.

When a computer is initially powered up, the normal facilities provided by the OS are not available. During the starting up process, a few small startup programs must be executed first to load the core of the OS into system memory. Procedures for loading the OS core from the system device may vary among vendors and hardware platforms. For example, many systems implement the process in two steps to locate and load the OS core. The primary startup program is usually kept in nonvolatile memory, while the secondary startup programs are typically located in the first few blocks of the operating system disk. These startup programs are non-OS programs, and are usually located outside of the OS filesystem. The secondary startup programs are also an essential part of an operating system disk.

B. Recovery Methods

In the prior art, recovery methods are parallel to the conventional ways in which the OS was originally installed.

Typically, an OS installation is initially performed within the original computer itself. Usually, it temporarily starts with an installation media, either locally or remotely. It first loads the installation operating system kernel, and executes it in the system memory. The installation kernel contains a limited subset of system utilities provided by the normal operating system. It enables the system to be installed to copy the OS software from the installation media to its own permanent disk. Similarly, recovery processes with all prior methods are implemented within the replacement computer. The replacement computer temporarily starts with a recovery tool, typically an installation media, and copies the system backup image from the backup source, either locally from its own backup device or remotely from shared backup devices on the backup/recovery server, to its own permanent OS disk.

(1) Local Methods and Drawbacks

Computer manufacturers usually provide a variety of backup and recovery utilities associated with their operating systems. These native backup recovery utilities provide simple and basic tools to allow skilled technicians to perform backup and recovery operation. If a computer is damaged and its replacement is equipped with a backup device, the replacement computer can be simply rebuilt from the backup image in its directly attached backup device. The methods of this type are often known as local methods. A local method is a simple and widely used recovery method by those skilled in the field, and works well for a small environment. However, local methods pose various problems for a large corporate data center. Local methods poorly utilize backup hardware resources because they require that every computer be equipped with its own backup device. Furthermore, because they require a large number of individual backup devices, they are very difficult to manage. Examples of native backup recovery utilities include "dd", "dump", and "restore" among variants of UNIX operating systems, and "XCOPY" and "NTBACKUP" among variants of Microsoft Windows operating systems. Examples of proprietary products of this type include "mksysb" of the IBM AIX operating system and "make_recovery" and "btcreate" of the HP HP-UX operating system and the Tru64 operating system, and Symantec Norton Ghost for Windows operating systems.

(2) Improved Networked Methods

Networked methods overcome many drawbacks of local methods. Networked methods allow the backup hardware to be shared and also allow the backup and recovery operation to be centrally managed.

Networked methods are client-server solutions. A recovery server centrally controls and manages backup and restore operations for other computers to be protected. Networked methods utilize computer networks and networking protocols, typically the TCP/IP protocol set. TCP stands for Transmission Control Protocol, and IP for Internet Protocol. TCP/IP is typically implemented in each computer to allow data communication among computers in a computer network.

In case of a failed OS disk, special preparation is required for a networked methods recovery. In order to access a recovery image located in the centralized backup storage, a fresh replacement computer needs to start with not only a basic operating system, but also with a proper networking connection and configuration, and the networked recovery utility. This is because the recovery image is located in the centralized backup storage on the server computer. Furthermore, the replacement computer also requires proper security permission to be set to communicate with the server computers. The OS disk can be then rebuilt by copying the recovery image from the server over network.

It is not uncommon for a large data center to be equipped with thousands of business computers. Each system is typically equipped with several gigabytes of system software and data. If only a few computers are required for recovery, recovery speed may be not an issue since it is usually determined by the bandwidth of the network. However, for a mass recovery operation, thousands of recovery client computers flood a large amount of data requests and put too much CPU load on the server to handle. In case of a mass recovery operation, TCP/IP becomes a serious performance bottleneck for networked methods, in addition to the problem of limited network bandwidth. This is because networked solutions rely on TCP/IP to accomplish data transfer from the server to its recovery clients. TCP/IP is not efficient in design to handle such a large amount of data transfer.

Examples of the networked products for system recovery include NetWorker Recovery Manager™ from EMC Corp, and Tivoli Disaster Recovery Manager™ from IBM, Bare Metal Restore™ from Veritas Software, and Ghost Corporate Edition™ from Symantec. Examples of networked backup recovery methods also include U.S. Pat. Nos. 5,212,772; 5,133,065; and 5,799,147.

As noted above, the local methods all suffer from the drawbacks of manageability and hardware inefficiency. On the other hand, networked methods overcome these drawbacks by utilizing TCP/IP and computer network. However, TCP/IP and computer network become serious limiting factors to prevent effective mass recovery operation in the case of a major disaster. Especially after Sep. 11, 2001, same-day recovery and no data loss have become business requirements. Therefore, it is urgent to develop more effective and quicker methods for computer system disaster recovery.

BRIEF SUMMARY OF THE INVENTION

Accordingly, the main object of the present invention is to fulfill the urgent need for an effective technique to rapidly rebuild a large number of computers with minimal data loss in the event of a major disaster. The invention provides a computer cloning system (known as the "Cloning Machine") and a method (known as "System Cloning") to allow a mass restoration to be performed from in a remote site much faster than was heretofore possible.

One important advantage of the invention is that this cloning method is a computer network independent solution. With this invention the cloning process is accomplished within the cloning machine instead of within the replacement computer as the prior technologies do. The cloning process occurs within the cloning machine instead of between the recovery server and the replacement computer as prior technologies of network methods do. This method eliminates the need of a TCP/IP-based computer network and the TCP/IP itself which are significant limiting factors in being able to quickly restore a large number of failed computers. With the ability to centrally manage cloning operations, the cloning procedure of the present invention is thus significantly simplified. Required cloning time is also significantly reduced with this invention. Furthermore, by eliminating computer network dependency, the reliability of the cloning method is significantly enhanced. In contrast, many prior technologies, such as the widely used networked methods, rely on a TCP/IP computer network and networking protocols. With a networked method, recovery data need to be transferred through a network between a recovery server and a replacement computer.

Another advantage of the invention is that more than one independent cloning machine can be implemented at each site. These machines are all independent of each other. When multiple cloning machines are implemented, if a cloning machine fails for some reason, others are still able to continue the cloning operation. Performance bottlenecks and cloning operation single-point-of failures are thus significantly reduced. As a result, dependencies on servers and computer networks are eliminated, which significantly increases the reliability of the disaster recovery method of the present invention. In contrast, networked methods are client-server solutions. Many networked methods require three or more servers together to perform a recovery operation. In case a problem is encountered by any server, the recovery process will be interrupted. Therefore, networked methods are prone to multiple points of failure.

A third advantage of the invention is that it provides a more flexible cloning method. It is desirable for cloning methods to be able to reproduce an existing computer with replacement hardware that is significantly different from the original. It is also desirable for cloning methods to be compatible with a wide range of operating systems, including all major variants of UNIX and Windows operating systems. Furthermore, it is desirable that cloning methods are able to manage various advanced file structure formats such as logical volumes. Non-compatible hardware often complicates and prolongs the cloning or recovery process because identical hardware is often difficult to obtain, especially at the time of a disaster. The invention solves this problem and provides for all of the above desired features. The invention also provides the capability to modify the existing/survival/replicated OS device so that it can be adapted to replacement computers with different hardware.

To achieve the above performance features, the present invention provides a computer cloning machine and cloning method (of operation thereof), which allows a large number of damaged computers to be restored much faster compared with prior technologies. The cloning machine generally comprises (1) a computer system that centrally controls and manages the cloning operation, (2) a shared storage system that maintains backup and replicated OS images and provides means to modify these images at a remote recovery site, and (3) a disk subsystem that accommodates disks so that mass disk restoration can be performed within the cloning machine for a large number of replacement computers. Multiple cloning machines can be implemented at each remote site. The cloning method utilizes the cloning machine to modify the OS device image of damaged computers so that they can adapt to the new hardware of the replacement computers. Such cloning processes are performed within the cloning machine instead of within the replacement computer itself as taught in the prior art. Unlike prior art, the cloning machine is a separate machine from both the damaged and the replacement machines. The cloning method of the present invention is a computer network independent solution.

The present invention provides an efficient method and machine for cloning computer systems and for computer disaster recovery. Compared with prior technologies, it delivers superior performance with significantly less recovery time. The present invention also provides a more efficient method for computer system hardware and/or software upgrades, computer testing, new computer installation and system migration.

Further advantages of the present invention will become apparent from a consideration of the attached drawings and ensuing description. It is to be understood that the present invention may be embodied in various forms. Therefore, both the general description above and the detailed description below are exemplary but not restrictive of the invention as claimed. The drawings, together with the detailed descriptions, illustrate a number of embodiments which serve to explain the general principles of the present invention, and to teach those skilled in the field to employ the present invention in virtually any appropriately detailed system, structure or manner.

DESCRIPTION OF THE SEVERAL VIEWS OF THE DRAWING

FIG. 3 shows a schematic diagram of an embodiment that implements the present invention at two sites. Each of the two sites is equipped with a Cloning Machine. Cloning Machines 8 and 8' can share storage systems located at separated sites via a storage-area-network (SAN 7) that consists of a plurality of SAN switches 6 and 6' linked together. The target computer is used to provide the same functions as the existing computer when the existing computer needs to be replaced.

DETAILED DESCRIPTION OF THE INVENTION

Computer system cloning is a process to reproduce a computer with identical business functions as the original, usually with different replacement hardware. This invention provides a novel computer system cloning method to quickly reproduce systems via modifying the survived or reproduced OS device images after a catastrophic failure.

Figure 1:
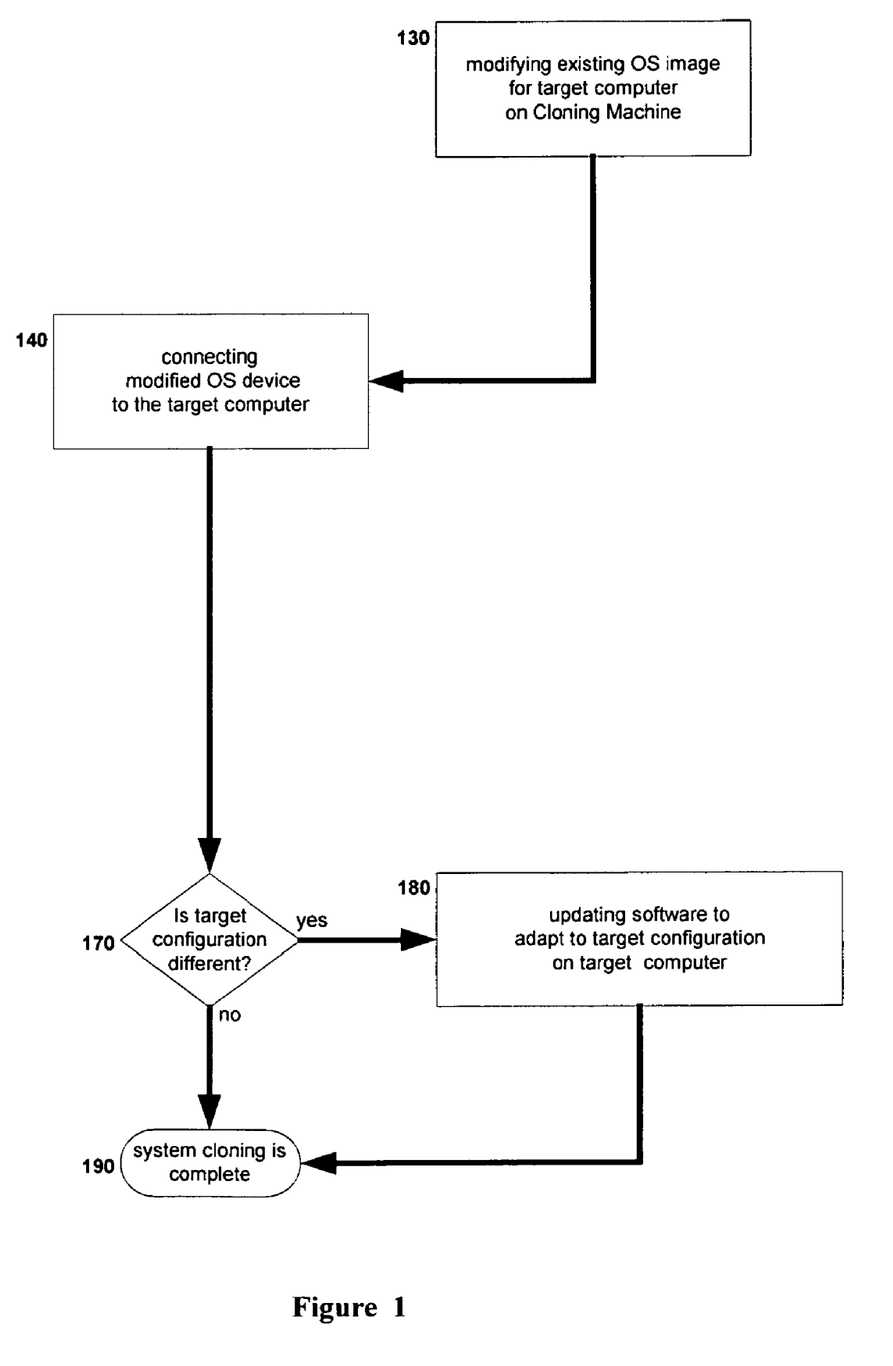
FIG. 1 is a flow diagram of a method that implements the present invention.

FIG. 1 illustrates a basic method which implements the present invention. A reproduced or replicated OS disk image for a target computer 10 is maintained on the disk subsystem 2 of the Cloning Machine 8. The replicated OS device image is updated with the relevant system device drivers and data to conform to the target computer configuration on the Cloning Machine in the modifying step 130. Then, the modified OS disk (a storage medium of the disk subsystem 2) is connected to the target computer 10 in the modifying step 140. Next, the configurations of the existing and target computers, both hardware and software, are compared in step 170; if they are different, the software is further modified to adapt to the target hardware in step 180. Then, the cloning process is completed in step 190.

Figure 2:
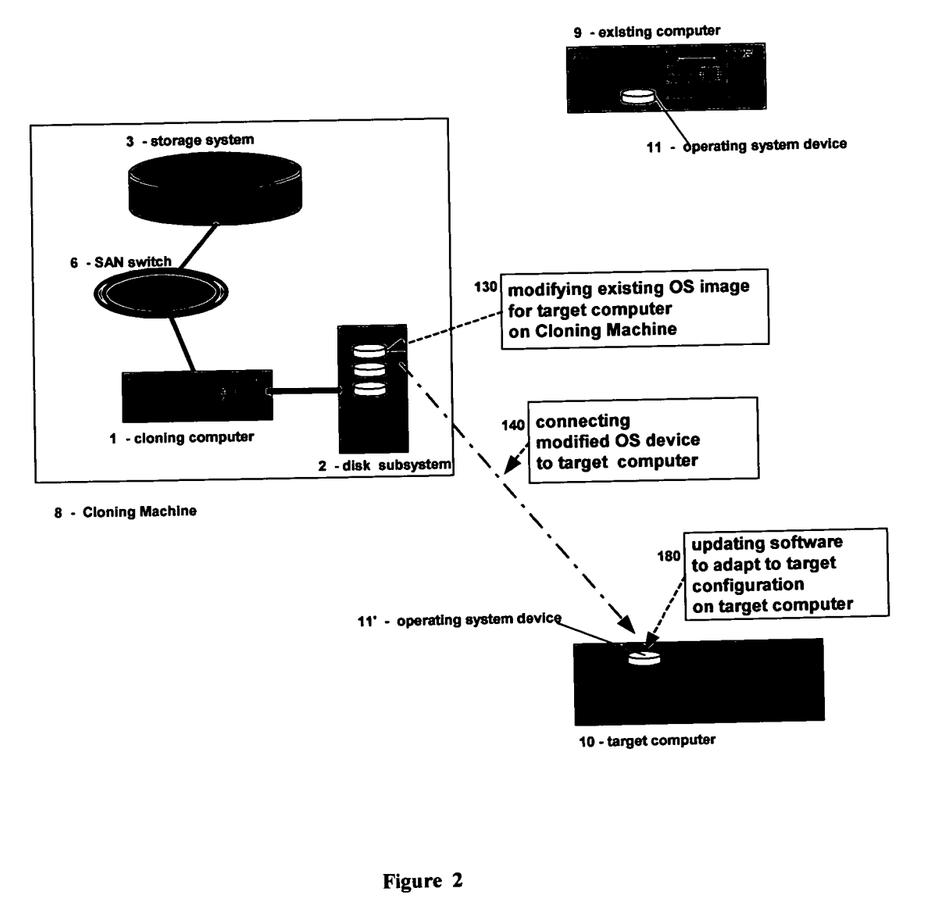
FIG. 2 shows a preferred hardware configuration of a Cloning Machine 8 that implements the present invention to clone an existing computer 9 into a target computer 10. A Cloning Machine generally comprises: (a) a cloning computer 1; (b) a disk subsystem 2; (c) a storage system 3; and (d) a storage-area-network (SAN) switch 6, respectively. The target computer is used to provide the same functions as the existing computer when the existing computer needs to be replaced. Operating system devices 11 and 11' are storage mediums to hold operating system software required to run the computers.

FIG. 2 illustrates a preferred hardware configuration of a Cloning Machine that implements the present invention. The machine generally comprises: (a) a cloning computer 1; (b) a disk subsystem 2; (c) a storage system 3, and (d) a storage-area-network ("SAN") switch 6.

The cloning computer 1 is used to centrally manage the system cloning operation, including manipulation of the OS disk and filesystem. The operating system of cloning computer 1 can be a UNIX or Microsoft Windows variant.

The disk subsystem 2 is used to accommodate OS disks for target computers to be reproduced. It can be either a set of internal disks or an external disk subsystem connected to the cloning computer 1. The disks must be compatible with the target computer 9 to be rebuilt and be able to serve as its OS disk.

The storage system 3 is used to manage OS disk images for the existing computers 10 to be replicated. It can be either internal disks or an external storage system. The external storage can be either disk or tape systems, or other backup media devices. The choice of the storage system is often determined by the tradeoff between cost and performance. High-end storage systems of Redundant Array of Independent Disks ("RAID") often provide the ability of instantly replicating backup images at a remote location. Instant data replication reduces possible data loss in the event of a disaster.

Storage-area-network ("SAN") switch 6 interconnects storage systems and computer systems. It enables multiple computers to share storage systems 3, and therefore, improves the system cloning performance and capacity for a mass system cloning operation.

Figure 3:
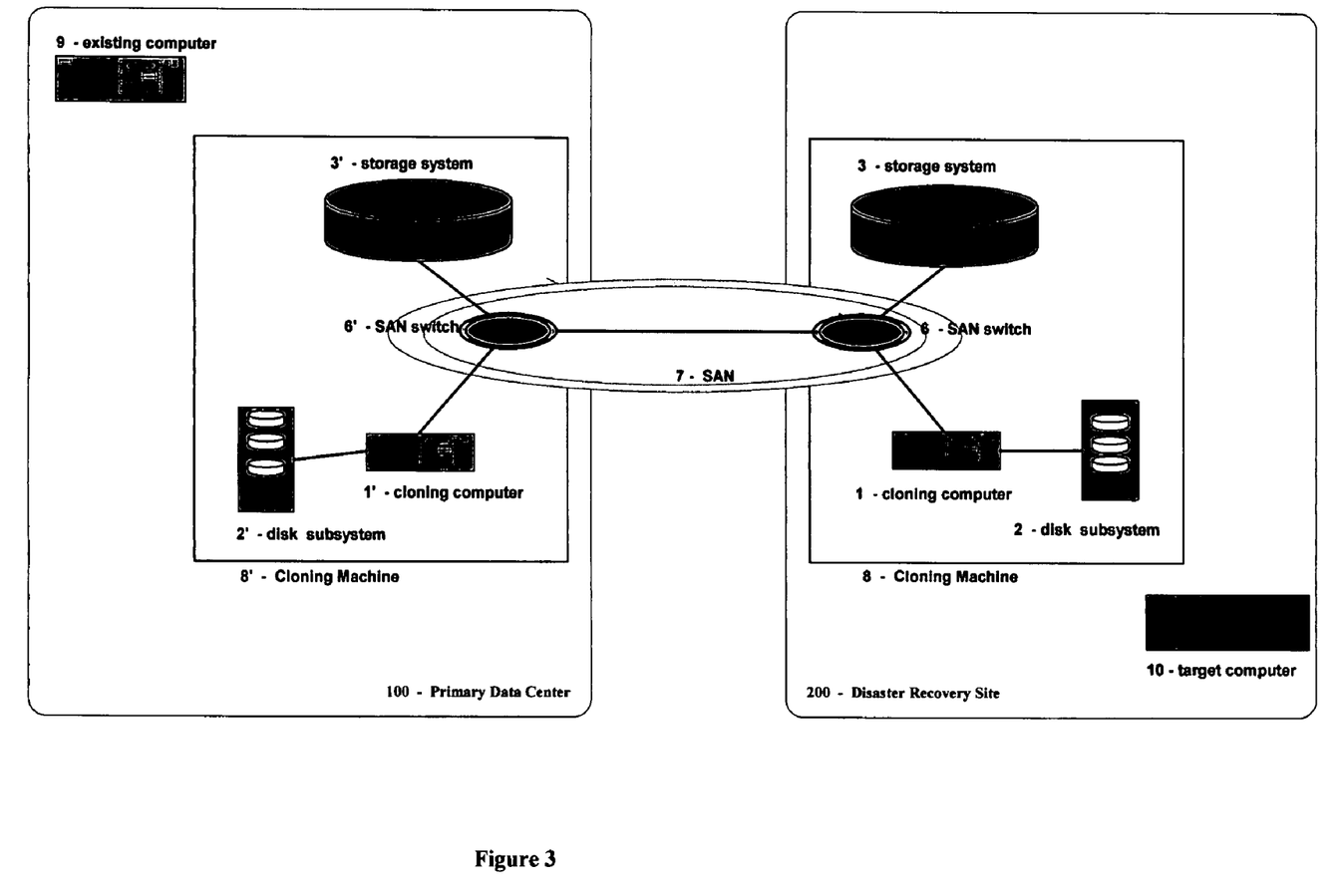

FIG. 3 illustrates an alternative improved hardware configuration of the Cloning Machine 8. With this type of configuration, multiple Cloning Machines can be readily implemented in physically separated data centers. As shown in FIG. 3, two Cloning Machines 8 and 8' are connected by a SAN 7 that is formed by two SAN switches 6 and 6' located in separate locations. This configuration not only improves performance and capacity but also provides a limited distant extension. In case a data center is destroyed, another may survive with an independent Cloning Machine and retain all system information and functions because of the physically separate nature of this configuration.

Those of ordinary skill in the art will appreciate that the present invention, including each of the hardware configurations shown in FIGS. 2-3, inclusive, and/or each of hardware components of each configuration, may be embodied in various forms. Implementation may vary depending on the tradeoff between cost and performance, and other considerations. In practice, it is sometimes desirable to reduce cost by sacrificing some valuable functions and/or performance. The operating system of the cloning computer 1 can be one of several UNIX or Windows variants. The computer may be configured with different capacity, including but not limiting to different amounts of CPU, RAM, and/or storage. Implementation with multiple computers, storage systems, disk subsystems, and/or connections can be implemented. Such implementation not only improves performance and capacity, but also minimizes weak points in a mass recovery operation.

OPERATION

The present invention provides a computer system cloning method that can be used to rapidly reproduce a computer system (target computer) with identical functions of the original (existing computer). The computer system cloning process usually starts with a reproduced operating system device image since it contains complete system information, including its unique identification, system configuration files and other system data and parameters. Conventionally, a recovery process is accomplished by a replacement (target) computer itself to reproduce a system disk with a previously saved OS disk image from backup devices, typically tapes. Unlike conventional recovery methods, this invention starts with modifying a system device image on a Cloning Machine 8 rather than on the replacement (target) computer 10. For example, OS images of the existing computer 9 can be saved in advance on the storage system 2, while a reproduced OS device image is maintained on the disk subsystem 3. The rebuilt OS disk for the target computer 10 is modified on a Cloning Machine 8 and subsequently moved into or connected to the replacement (target) computer 10. On the Cloning Machine, OS images corresponding to an existing computer 9 on the storage system 3 and reproduced OS device images corresponding to a target computer 10 on the disk subsystem 2 appear in the same manner to the operator even though the actual hardware configuration of the Cloning Machine may be significantly different, as shown in FIGS. 2-3, inclusive. As a result, the manner of operation of data manipulation with the present invention is independent from the actual hardware configuration of the Cloning Machine.

To illustrate how to use this invention, Sun Microsystems 280R computers are used as examples of a cloning computer 1, an existing computer 9, and a target computer 10 as shown in FIG. 2. One equipped with a single CPU and one internal disk is chosen as the original (existing computer 9). The replacement hardware (target computer 10) is another 280R equipped with two CPUs and two internal disks of the same type, and additional PCI networking interface card.

A replicated disk (operating system device 11') for the new replacement 280R (target computer 10) is maintained in the disk subsystem 2 of a Cloning Machine 8, and must be modified in order for the replacement 280R (target computer 10) to be operational. This is because the replacement 280R (target computer 10) cannot start up with the replicated OS disk since the replicated OS image is encoded with machine specific codes corresponding to the existing computer 9. In this example, each internal disk of the 280Rs has a worldwide unique identifier that encodes into the original OS image replicated from the existing computer 9. All relevant system files and data of the replicated OS image need to be updated to adapt to the new replacement 280R. The updates are needed to reflect the actual change in hardware configuration. These include /etc/path_to_inst file and those files in /devices and /dev directory trees on the replicated disk. These relevant system files, including all device drivers and configuration data, allow the new replacement computer to properly manage its hardware components, such as the rebuilt OS disk. The /etc/path_to_inst specifies hardware devices installed in the system. The files in /devices and /dev directory trees allow the computer to correctly identify its devices, including the rebuilt OS disk.

The valid system device files can be prepared in advance, derived from a Solaris OS installation CD or a similar working system, and saved on the shared storage system 3. To adapt to the new replacement 280R hardware (target computer 10), these files are copied into the corresponding directories of the replicated disk (a storage medium of the disk subsystem 2) on the Cloning Machine, corresponding to the step 130 in FIG. 8. In practice, the procedures of updating system file and data here can be written into a shell program. Execution of such a shell program will significantly simplify the operation described here.

If the original OS disk of the existing computer 9 is configured with Veritas volume manager software, the configuration that enables Veritas software to control the operating system disk should be disabled. This is usually accomplished by (1) changing the /etc/vfstab to use the standard disk slice names instead of the Veritas software's logical volume names, and (2) removing two lines of "rootdev:/pseudo/vxio@0:0" and "set vxio:vol_rootdev_is_volume=1" from a system configuration file named /etc/system. The actual procedure should be implemented by following the vendor's system administration manuals. Alternatively, those files previously saved prior to Veritas software configuration can be copied back to a directory named /etc. After the Veritas software configuration is disabled, the computer with such a replicated OS disk becomes operational. The Veritas software should then be removed. If desirable, the same software can be reinstalled by following the instruction as described in the vendor's software installation manuals. Alternatively, without removing the software, a reconfiguration procedure can be performed by following the instruction as described in the vendor's system administration manuals.

If the original OS disk of the existing computer 9 is configured with Sun volume manager software, the configuration that enables the Sun volume manager software to control the operating system disk should be disabled. As with Veritas software, this procedure is usually accomplished by (1) changing the /etc/vfstab to use the standard disk slice names instead of the Sun volume manager software's logical volume names; and (2) modifying the configuration file of /etc/system. The actual procedure should be implemented by following the vendor's system administration manuals. After the Sun volume manager software configuration is disabled, the computer with such a replicated OS disk should be operational. If needed, a procedure of re-configuration or remove-then-install of the same software module should be performed by consulting the vendor's software manuals.

After modifying the reproduced OS image to adapt to the new replacement 280R (target computer 10), the modified disk (a storage medium of the disk subsystem 2, and subsequently becoming operating system device 11' of the target computer 10) is then moved from the Cloning Machine 8 into the replacement 280R (target computer 10) in the same location as the existing computer 9, corresponding to the step 140 in FIG. 8, and the cloned 280R (target computer 10) can start from the cloned OS disk (operating system device 11'). Thus the computer system cloning process is completed.

To illustrate how to clone different hardware, computers from Sun Microsystems are chosen here as examples. The original computer (the existing computer 9) is a model of 280R with a single CPU, a single internal disk in slot 0 and a JNI's FCE-6410 Host-Bus-Adapter ("HBA"). The replacement computer (target computer 10) is a model of V880 equipped with two CPUs, six internal disks of the same type, and a newer JNI FCX2-6562 HBA.

A reproduced OS disk (a storage medium of the disk subsystem 2, and subsequently becoming operating system device 11' of the target computer 10) for the new replacement V880 (target computer 10) is maintained in the disk subsystem 2. On Cloning Machine 8, the reproduced OS device is modified to adapt to the replacement V880 with the procedure described above, corresponding to the step of 130 in FIG. 8. The replicated disk (a storage medium of the disk subsystem 2, and subsequently becoming an operating system device 11') is then moved into slot 0 of the replacement V880, corresponding to the step 140 in FIG. 8. Thus the replacement V880 should be basically operational with the modified OS device except having problems with new HBA. The old HBA software for JNI FCE-6410 should be removed by following the instruction as described in the vendor's product manuals. Then the new software package for JNI FCX2-6562 HBA should be installed and configured by following the instruction as described in the vendor's product manuals, corresponding to the step 180 in FIG. 8. At this point, the system cloning is completed, corresponding to the step 190 in FIG. 8.

Although this invention has been described with a certain degree of particularity, it is to be understood that the present disclosure is made by way of illustration, and that numerous changes in the details of construction and arrangements of parts, or in choice of commands and/or programs with similar functions, may be resorted to without departing from the spirit and scope of the invention. For example, without limitation, the computer OS may be other than variants of UNIX of Windows, as long as appropriate corresponding utilities are utilized.

I claim:

1. A method of using a cloning machine to clone an existing computer into a target computer wherein:
   the existing computer comprises an existing configuration and a working operating system software image;
   the target computer comprises a target configuration;
   and there is a difference between the existing configuration and the target configuration;
   the method comprising:
   (a) providing computer processor means for processing data;
   (b) providing computer storage means for storing the operating system software image corresponding to the existing computer, and a storage medium for storing an operating system software image for the target computer;
   (c) modifying a portion of the operating system software image corresponding to said existing computer into the target operating system software image for said target computer on said storage medium to accommodate said difference, whereby said modifying of operating system software image occurs on said cloning machine that is not said existing computer nor said target computer;
   (d) connecting said storage medium with said modified operating system software image from said cloning machine to said target computer;
   (e) upgrading software or data to accommodate said difference;
   whereby said target computer will provide the same functions as said existing computer,
   whereby said cloning machine is for use in one or more of the uses in the group consisting of computer disaster recovery, computer upgrade, computer testing, computer migration, and computer installation.

2. A method of using a cloning machine to clone an existing computer system comprising a plurality of existing computers into a target computer system comprising a plurality of target computers wherein:
   each of the existing computer comprises an existing configuration, and a working operating system software image;
   each of the target computer comprises a target configuration;
   the target computers are in a one-to-one correspondence with the existing computers;
   and there is a difference between each of the existing configuration and the target configuration on the corresponding target computer;
   the method comprising:
   (a) providing computer processor means for processing data;
   (b) providing computer storage means for storing the operating system software images for the existing computers, and storage mediums for storing operating system software images corresponding to each of the target computers;
   (c) modifying a portion of the operating system software image of each of the existing computers into the target operating system software image corresponding to each of the target computers on said storage medium to accommodate said corresponding difference, whereby said modifying of operating system software image occurs on said cloning machine that is not any of said existing computer nor any of said target computers;
  (d) connecting each of said storage mediums with the modified operating system software images from said cloning machine to each of the corresponding target computers;
  (e) upgrading software or data to accommodate said difference;
whereby the plurality of said target computers will be produced by using said cloning machine,
whereby each of said target computers will provide the same functions as said corresponding existing computer,
whereby said cloning machine is for use in one or more of the uses in the group consisting of computer disaster recovery, computer upgrade, computer testing, computer migration, and computer installation.

3. A cloning machine for cloning an existing computer into a target computer wherein:
  the existing computer comprises an existing configuration and a working operating system software image;
  the target computer comprises a target configuration;
  and there is a difference between the existing configuration and the target configuration;
  the cloning machine comprising:
    (a) computer processor means for processing data;
    (b) storage means for storing the operating system software image corresponding to the existing computer, and a storage medium for storing an operating system software image for the target computer;
    (c) modifying means for modifying a portion of the operating system software image corresponding to the existing computer into the target operating system software image corresponding to the target computer on said storage medium to accommodate said difference, whereby said modifying means is provided by said cloning machine that is not said existing computer nor said target computer;
    (d) connecting means for connecting said storage medium with said modified operating system software image from said cloning machine to said target computer;
    (e) updating means for upgrading software or data to accommodate said difference;
  whereby said target computer will provide the same functions as said existing computer,
  whereby said cloning machine is for use in one or more of the uses in the group consisting of computer disaster recovery, computer upgrade, computer testing, computer migration, and computer installation.

4. The cloning machine as described in claim 3, further comprising simultaneous modifying means for modifying a plurality of operating system software images corresponding to a plurality of existing computers into a plurality of target operating system software images corresponding to a plurality of target computers, said cloning machine being neither any of said existing computers nor any of said target computers,
  whereby each of said target computers will provide the same functions as said corresponding existing computer.

5. The cloning machine as described in claim 4, wherein the cloning machine is located in one location.

6. The cloning machine as described in claim 4, wherein the cloning machine is located in a plurality of locations.

* * * * *